United States Patent
Warren

(10) Patent No.: US 6,868,870 B2
(45) Date of Patent: Mar. 22, 2005

(54) METHOD OF LINING A PIPELINE USING A CALIBRATION HOSE

(76) Inventor: Daniel Warren, 18 Shaw Rd., Carver, MA (US) 02330

(*) Notice: Subject to any disclaimer, the term of this patent is extended or adjusted under 35 U.S.C. 154(b) by 0 days.

(21) Appl. No.: 10/695,188

(22) Filed: Oct. 28, 2003

(65) Prior Publication Data

US 2004/0134551 A1 Jul. 15, 2004

Related U.S. Application Data

(60) Provisional application No. 60/422,432, filed on Oct. 30, 2002.

(51) Int. Cl.[7] .................................. F16L 55/16
(52) U.S. Cl. ................. 138/98; 138/97; 405/150.1; 156/287; 156/294; 264/269
(58) Field of Search .................. 138/98, 97; 156/287, 156/294; 264/516, 36.17; 405/150.1, 184.2

(56) References Cited

U.S. PATENT DOCUMENTS

| | | | | |
|---|---|---|---|---|
| 4,350,548 A | * | 9/1982 | Zenbayashi et al. ......... 156/156 |
| 4,456,401 A | * | 6/1984 | Williams .................. 405/150.1 |
| 4,770,562 A | | 9/1988 | Muller et al. ............... 405/154 |
| 4,778,553 A | | 10/1988 | Wood .......................... 156/287 |
| 5,049,003 A | * | 9/1991 | Barton ..................... 405/184.1 |
| 5,108,533 A | | 4/1992 | Long, Jr. et al. ............ 156/294 |
| 5,280,811 A | * | 1/1994 | Catallo et al. ................ 138/98 |
| 5,393,481 A | | 2/1995 | Wood .......................... 264/516 |
| 5,409,561 A | * | 4/1995 | Wood .......................... 156/287 |
| 5,477,887 A | * | 12/1995 | Catallo ........................ 138/97 |
| 5,653,555 A | | 8/1997 | Catallo ....................... 405/154 |
| 5,680,885 A | | 10/1997 | Catallo ........................ 138/98 |
| 5,706,861 A | | 1/1998 | Wood et al. ................... 138/98 |
| RE35,944 E | | 11/1998 | Driver et al. ................ 264/570 |
| 5,876,645 A | | 3/1999 | Johnson ...................... 264/102 |
| 5,993,581 A | * | 11/1999 | Toyoda et al. ................ 156/94 |
| 6,001,212 A | | 12/1999 | Polivka et al. .............. 156/287 |
| 6,117,507 A | | 9/2000 | Smith ......................... 428/36.9 |
| 6,354,330 B1 | | 3/2002 | Wood .......................... 138/97 |
| 6,539,979 B1 | * | 4/2003 | Driver ......................... 138/98 |
| 6,703,091 B1 | * | 3/2004 | Walker ....................... 428/34.5 |

FOREIGN PATENT DOCUMENTS

| WO | WO 97/08487 | 3/1997 |
|---|---|---|
| WO | WO 99/05085 | 2/1999 |

OTHER PUBLICATIONS

PCT WO 98/54509 Berry et al. 12/1998.*
PCT WO 93/13350 Wood 7/1993.*

* cited by examiner

Primary Examiner—Patrick Brinson
(74) Attorney, Agent, or Firm—Barlow, Josephs & Holmes, Ltd.

(57) ABSTRACT

The present invention is an improved method for installing a liner to repair a pipeline. The method involves placing a flexible lining hose that is coated with a thermosetting resin in the pipeline. A thermosetting resin is also applied to the interior walls of the pipeline. A calibration hose is introduced into the lining hose and pressurized fluid is injected therein. The fluid presses the lining hose against the interior surface of the pipeline and cures the first and second thermosetting resins. The curing of the resins bonds the lining hose to the pipeline to form a rigid monolithic composite structure having high mechanical strength.

18 Claims, 4 Drawing Sheets

METHOD OF LINING A PIPELINE USING A CALIBRATION HOSE

CROSS-REFERENCE TO RELATED APPLICATIONS

This application claims the benefit of U.S. Provisional Application No. 60/422,432 having a filing date of Oct. 30, 2002, the entire contents of which are hereby incorporated by reference.

BACKGROUND OF THE INVENTION

The present invention generally relates to a method for repairing a pipeline, such as a sewer pipe, by installing a liner inside of the pipeline. Particularly, the invention involves applying a curable resin to the inside walls of the pipeline and installing a flexible lining hose that is coated with a curable resin in the pipeline.

There are numerous pipeline conduits that run underground including water lines, sewer pipes, storm water drains, and the like. These pipelines often must be repaired to fix holes, cracks, and other defects in the line. The pipeline may deteriorate due to ordinary aging, corrosive action of the fluids being transported in the line, unusual environmental conditions, or other reasons. In any event, it is important that the pipeline be mended in order to prevent fluid leakage problems. In some instances, foreign matter may leak through the cracks and into the pipeline conduit. For example, rust, asbestos, and other substances may flow from the surrounding underground environment into the pipeline and contaminate drinking water. In other instances, the water that is being carried through the pipeline conduit may flow outwardly through the cracks leading to a loss of water pressure and other problems.

There are various known methods for renovating existing underground pipelines. Many of these methods employ a lining hose and a calibration hose. For example, Muller, U.S. Pat. No. 4,714,095 discloses a method of salvaging an underground sewer pipe with a lining hose and calibrating hose. The lining hose includes an inner layer which is treated with a first resin, and an outer layer which is not treated with a resin. The lining hose is placed into the pipe conduit. A surface region of a calibrating hose which will contact the inner layer of the lining hose is coated with a second resin. Then, the calibrating hose is introduced into the lining hose. The resins harden so that the lining hose becomes attached to contact surfaces of the calibration hose.

Müller, U.S. Pat. No. 4,770,562 discloses another method of salvaging an underground pipe conduit. A lining hose having an inner layer which is saturated with a resin is used. The lining hose includes an outer layer which is perforated to form flow-through openings for the resin of the inner layer. The lining hose is introduced into the pipe conduit. Then, the lining hose is shaped to conform to the pipe by introducing an auxiliary hose into the lining hose and injecting fluid into the auxiliary hose. The resins harden to form a lining structure in the pipeline. After the curing step, the auxiliary hose can be kept in the lining hose or it can be removed by ropes or cables.

Catallo, U.S. Pat. No. 5,653,555 discloses a method of lining a pipe conduit using multiple curing resins. A lining hose which is coated with a high-strength resin is first positioned inside of the conduit. The lining hose is then expanded into contact with the inside surface of the conduit by inverting a calibration hose. The calibration hose has a layer of corrosion-resistant resin. The high-strength and corrosion-resistant resin layers are cured by the application of a heated fluid. The cured lining hose and calibration hose form a rigid self-supporting structure. The calibration hose is not removed from the liner.

Catallo, U.S. Pat. No. 5,680,885 discloses a method of rehabilitating a damaged pipe conduit using a lining hose and calibration hose. The inner layer of the lining hose is soaked with an excess volume of resin. The calibration hose contains a resin-absorbent layer. The calibration hose is placed in the lining hose and inverted by the application of heated water. After inversion, the resin-absorbent layer of the calibration hose contacts and adheres to the resin coated layer of the lining hose. Upon curing, the calibration hose becomes an integral part of the liner.

Wood, U.S. Pat. No. 5,706,861 discloses a method of lining a section of a pipeline by a "cured in place" system using a lining tube and inflatable bladder. The lining tube is impregnated with a curable synthetic resin and carried into the pipe conduit on an annular inflatable bladder. The lining tube is cured to the pipeline. Then, the bladder is peeled away from the cured lining tube and removed from the pipe conduit by ropes.

Although the above-described conventional methods may be somewhat effective in repairing pipelines, they still suffer from various problems. For example, problems arise concerning the inversion of a felt liner because it is relatively delicate and tends to break or rip during the inversion process. Also, pulling prior art liner tubes around corners is very difficult resulting in fractures in the sealing at such joints. Also, the pipeline joints found at corners and periodically along the length of the pipeline forms voids which cannot be completely filled by the prior art methods. Thus, the prior art methods can do nothing to improve the strength of the pipeline at its joints.

In view of the foregoing, there is a desire for a structural lining process that effectively seals all of the leaks and cracks within a pipeline. It is also desirable to provide a lining process that preserves structural integrity of the liners throughout the length of the pipeline, including tight bend and turn locations within the pipeline. It is also desirable to improve the adhesion between the lining hose inside of the pipeline and the interior walls of the pipeline to ensure integrity of the liner for a permanent installation that does not need periodic repair.

SUMMARY OF THE INVENTION

The present invention relates to a method for installing a liner in a pipeline, such as an underground water pipeline. Installing such a liner enables a damaged pipeline to be repaired and salvaged and placed in a condition for normal use.

In accordance with the method of the present invention, the interior surface of the pipeline to be repaired and salvaged is first prepared by removing excess debris and dirt. For example, water is preferably sprayed at up 30,000 psi to clean and prepare the interior surface of the pipe. Even higher pressures can be used, if necessary. The pipe is then cleared of the standing water by high pressure air. Next, a first thermosetting resin is applied to the interior surface of the pipeline and then a flexible lining hose is placed in the pipeline. The lining hose has a flexible non-permeable outer layer and inner layer which is preferably made of felt material. The inner felt layer receives a second thermosetting resin. Next, a calibration hose is introduced into the lining hose. Pressurized fluid is injected into the calibration hose to press the lining hose against the interior surface of the pipeline and substantially cure the first and second thermosetting resins. This curing step causes the lining hose to physically bond to the interior surface of the pipeline. Afterwards, the calibration hose is removed from inside of the lining hose. The resulting composite structure includes a rigid lining hose firmly attached to the pipeline with a rugged, smooth and leak-free sealing inner surface of epoxy material which will be in communication with the flowing liquid in the pipe during normal use.

Therefore, it is an object of the present invention to provide a new and novel process for lining the interior surface of a pipeline to repair and salvage the pipe so that is can be used normally in a leak-free condition.

It is another object of the invention to provide a structural lining process that effectively seals all cracks and faults in an existing pipeline.

A further object of the invention is to provide a structural lining process that installs a sealing inner liner that is well suited to seal corner joints within a pipeline.

Another object of the invention is to provide a structural lining process that does not have the disadvantages of the prior art.

Yet another object of the present invention is to provide a structural lining process that is easy to carry out.

A further object of the present invention is to provide a structural lining process that relatively inexpensive to carry out compared to prior art processes without sacrificing the integrity of the sealing and repair accomplished by the process of the present invention.

Another object of the invention is to provide a method of installing a pipeline liner that improves the overall strength of the pipeline.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENT

The process of the present invention is used to repair a damaged underground pipeline, such as a water line, so that it can used in the normal course without undesirable leaks. As can be understood, cracks and leaks in a fluid line is undesirable to the associated pressure drops and flow inefficiencies. With a cracked pipeline, particles commonly break off from the inner surface of the pipeline thereby contaminating the fluid which flows through the pipeline.

Figure 1:
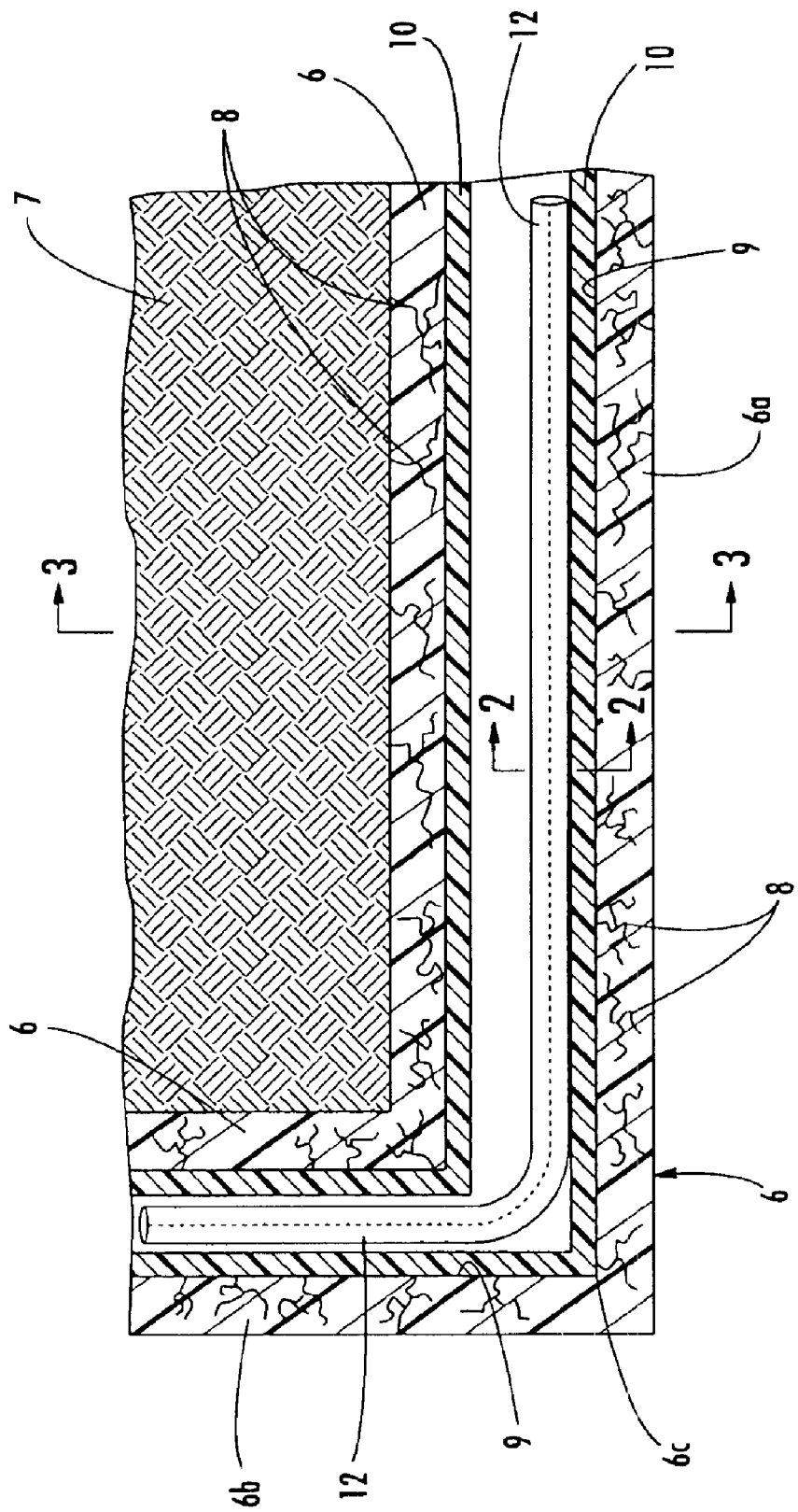
FIG. 1 is a side cross-sectional view of a pipeline within the ground showing a collapsed lining hose placed in position in the pipeline in accordance with the method of the present invention.

Referring first to FIG. 1, a side cross-section view of a typical pipeline installation is shown. The pipeline or host pipe 6 is installed in the ground 7 where a number of cracks 8 exist representing undesirable leaks. The pipeline 6 includes a horizontal section 6a and a vertical section 6b.

A common pipeline 6, as shown in FIG. 1, is typically made of concrete. Foreign matter, such as dirt, accumulates on the inner wall surfaces 9 over time. The debris (not shown) forms hard scale deposits on the wall surfaces, and these scales are difficult to remove. Also, degradation of the pipeline over time causes bits of the pipeline to break off which is exacerbated by cracks therein.

In accordance with the process of the present invention, the inside surface 9 of the pipeline 6, to be repaired, is preferably first prepared to remove the aforementioned debris and dirt to ensure a good bond, as will be described in detail below. Preferably, the inner wall surfaces 9 of pipeline 6 are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface 9 remaining. While high-pressure water is preferably used, air or steam may be used instead. Also, additional cleaning agents are not preferably used but such cleaning agents could be added to the water, air or steam to assist in cleaning depending the application and environment.

After surface cleaning is complete, any standing water left remaining, such as that on the bottom of the pipeline 6, must now be removed. High pressure air, using known air blowing equipment, is injected into the pipeline to clear it of any remaining cleaning media.

After the inner surface 9 of the pipeline 6 has been cleaned and prepared step, a thermosetting resin 10, such as an epoxy, onto the inside wall surface 9 of the pipeline 6. The thermosetting resin is applied in liquid form, and the resin remains in a substantially uncured state, until heat is applied to the resin as discussed in further detail below. Referring to FIG. 1, a host pipeline 6 having inside walls 9 with cracks 8 in their infrastructure is shown. The thermosetting resin 10 is sprayed onto the surfaces of the inside wall surfaces 9 in accordance with this invention. The resin 10 is sprayed on to wall surfaces 9 using known epoxy "spinning" technology where a traveling unit is passed through the section of the pipeline 6 to be coated. Details of such a applicator need not be discussed in detail herein as such apparatuses are well known in the art.

After the thermosetting resin 10 has been applied to the interior surface 9, a flexible lining hose 12 is positioned in the pipeline 6. The lining hose 12 is inserted into the pipeline 6 by techniques known in the industry. Preferably, the lining hose 12 is pulled or dragged into the pipeline 6 in a collapsed state using a cable and winch-operating system (not shown) which, for example, can use ¼ inch air craft cable. The lining hose 12 is introduced directly into the pipeline 6 so that it rests on the bottom surface of the pipeline 6. While it is preferred that the lining hose 12 is dragged into the pipeline 6 to be repaired, it is also possible to invert the lining hose 12 into the pipeline 6.

Figure 2:
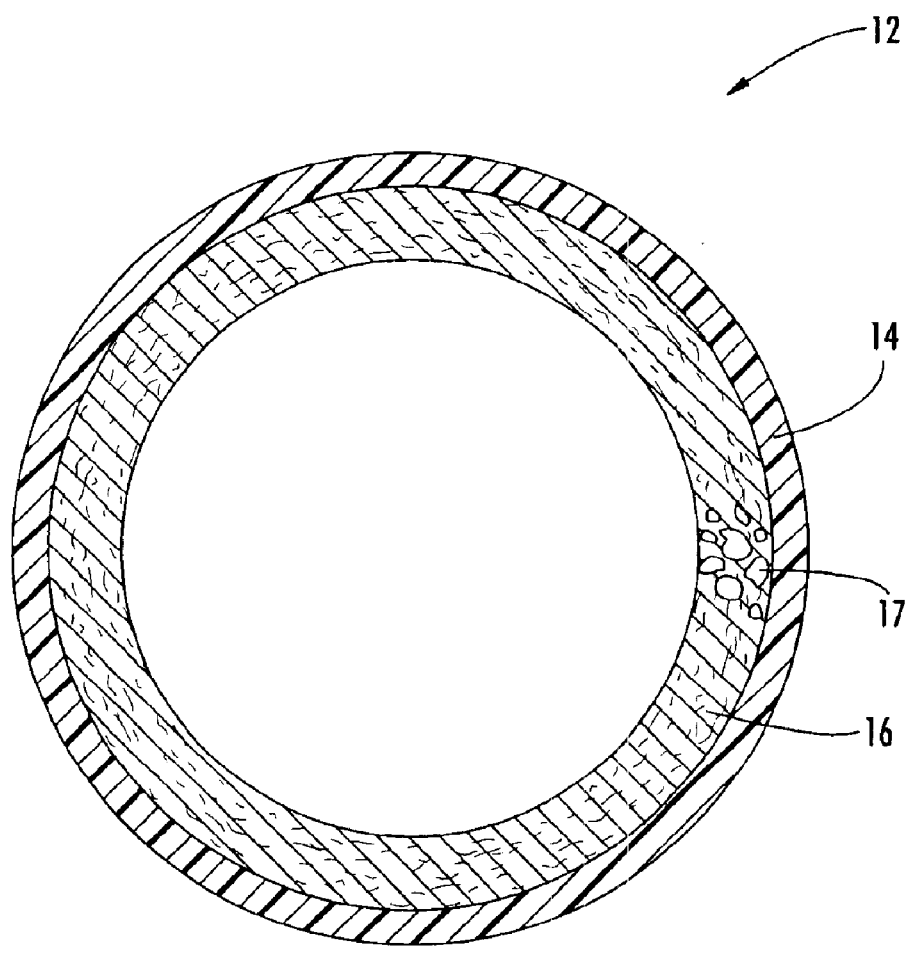
FIG. 2 is a cross-sectional view through the line 2—2 of FIG. 1 showing the layers of the lining hose.

Turning now to FIG. 2, details of the construction of the lining hose 12 of the present invention is shown. The flexible lining hose 12 includes an outer layer 14 that surrounds an inner layer 16. The outer layer 14 can be made from any suitable material that is rugged and which will adhere to thermosetting resin 10. Typically, the outer layer 14 is made from a plastic material such as polyvinyl chloride, polyurethane, polyethylene, polypropylene, polyester, polyamide, or the like.

The inner layer 16 is a layer of non-woven fibrous material, preferably felt, is permanently adhered to the outer layer of the lining hose 12. The felt inner layer 16 is provided as a suitable resin-absorbing material. More particularly, polyester-needled felt materials can be used to form the inner layer (16). These felt materials have good resin-absorbency properties. The felt material soaks up the resin so that the inner layer 16 becomes impregnated with the resin 17. The resin 17 may be applied to the inner layer 16 using vacuum, injection, or other methods known in the art. It is understood that the resin 17 can be applied to the felt inner layer 16 directly at the pipeline site where the lining hose 4 will be installed or at an off-site coating facility and then transported to the pipeline site.

Thus, the inner layer 16 is wetted out with the thermosetting resin 17 in liquid form ("wet out") prior to placing the lining hose 12 in the pipeline 6. As can be seen in FIG. 2, the resin 17 is absorbed by and resides within the felt inner layer 16. Thus, the felt inner layer 16 serves as a carrier for the resin 17. Resin 17 is preferably a 100% solid, slow cure, NSF-approved epoxy but also may be an NSF-approved flexible epoxy. The resin 10 and resin 17 remains in a substantially uncured state until heat is applied thereto, as discussed further below.

Many different types of curable thermosetting resins can be used for coating the inside walls 9 of the pipeline 6 and the inner layer 16 of the lining hose 12. The thermosetting resin should have good adhesive strength and have high strength (for example, high flex modulus, flex strength, tensile modulus, and tensile strength properties.) Slow-curing resins may be used. For example, polyesters; vinyl esters such as urethane-based vinyl esters, and bisphenol A-fumarate based vinyl esters; and epoxy resins can be used. Epoxy resins are particularly preferred. For example, a assignee of the present invention employs an epoxy product under the product number S301 for resin 10 and an epoxy product under the product number T301 for resin 17. The thermosetting resin 10 is applied to the inside pipeline walls 9 and resin 17 to the felt inner layer 16 of the lining hose 12 in an uncured, liquid form. The resins 10, 17 do not substantially cure in place until heat is applied as discussed further below.

Figure 3:
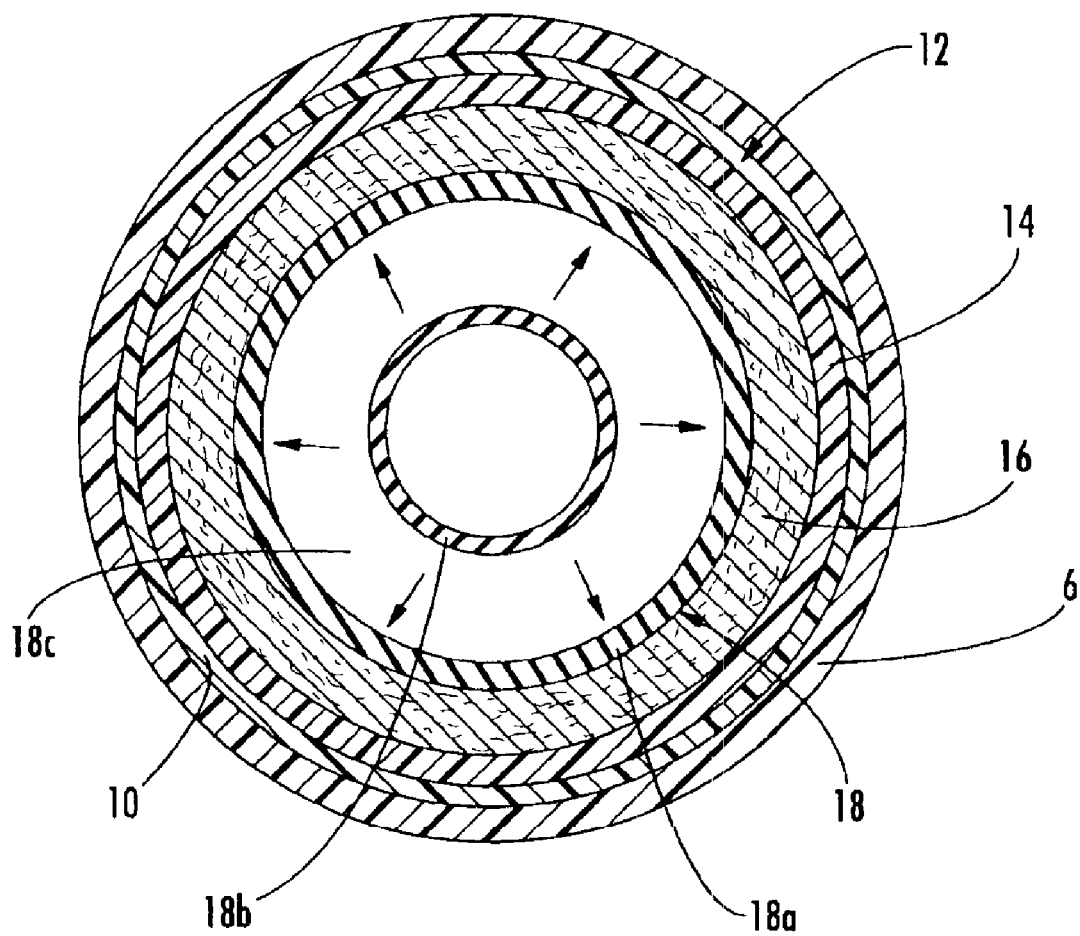
FIG. 3 is a cross-sectional view through the line 3—3 of FIG. 1 showing the step of the calibration hose pressing the lining hose into communication with the inner wall of the pipeline.

Referring to FIG. 3, a calibration hose, generally referred to as 18, is introduced into the resin-saturated lining hose 12 using techniques known in the industry. The calibration hose 18 can be made from materials such as polyvinyl chloride, polyurethane, polyethylene, polypropylene, polyesters, polyamides, or the like. The calibration hose 18 is not treated with a curing resin in the method of this invention. Most importantly, the calibration hose does not adhere to resin 17 residing in the felt inner layer 16.

The calibration hose 18 is inserted so that an outer peripheral region 18a is in communication with inner layer 16. The outer peripheral region is held in place by clamps (not shown) or the like so that an inner region 18b may be inverted therethrough. The calibration hose 18 is filled with a pressurized fluid, namely, at middle region 18c. Typically, water is used as the pressurized fluid by air or steam may be used. In one embodiment for introducing the calibration hose 18 into the lining hose 12, a known inversion technique is used. As the pressurized fluid is directed into the middle region, the calibration hose 18 is pulled via the inner region 18b. The inverted calibration hose 18 walks along the inside of the lining hose 12 and expands and presses its against the inner wall 9 of the pipeline 6.

The use of pressurized water (not shown) to invert the calibration hose 18 has several benefits. Particularly, the calibration hose 18 is filled with water gradually so that the calibration hose 18 walks-through the pipeline 6. As the calibration hose 18 is fed into the lining hose 12, it can easily travel, as shown in FIG. 1, from a vertical pipeline section 6b to a horizontal pipeline section 6a and vice versa. For example, vertical pipelines 6b generally refer to auxiliary pipelines that communicate with a horizontal (main) pipeline 6a. Joint connectors 6c are provided to transition from a horizontal section 6a to a vertical section 6b. It is these joint section that pose particular problems with prior art processes for repairing pipelines because air pockets are frequently introduced and lining hoses break or rip at these joints. However, with the present invention, air pockets in the calibration hose 18 are eliminated by slowly filling the calibration hose 18 with water and so that the joint sections 18c are completely sealed to completely fill cracks, stop leaks to provide a monolithic epoxy inner layer, even at joint sections 18c.

The pressurized water makes the inverted calibration hose 18 push against the flexible lining hose 12 and forces the lining hose 12 outwardly so that it presses against and engages the interior walls 9 of the pipeline 6. As a result, the lining hose 12 contacts and conforms to the shape of the internal pipeline walls 9. Due to the durability of the lining hose 12, joint sections 18c are adequately accommodated by the process of the present invention.

The water injected into the calibration hose 18 is heated to substantially cure and harden the thermosetting resins 10 and 17. Preferably, the water is heated to a temperature of at least 100° F. and more preferably to a temperature of about 130° F. The temperatures can vary depending on the resin selected for use. The curing reaction is exothermic so the curing of the resin, itself, generates heat that improves the curing rate. Also, the resins 10, 17 may contain heat-initiated curing agents which accelerate the curing process. Upon the curing and hardening of the resins 10, 17, the lining hose 12 becomes attached to the wall surfaces 9 inside of the pipeline 6. Preferably, the calibration hose 18 remains in place for 4–36 hours depending on the epoxies used, the environmental temperature and the temperature of the water introduced into the calibration hose 18 for curing.

Figure 4:
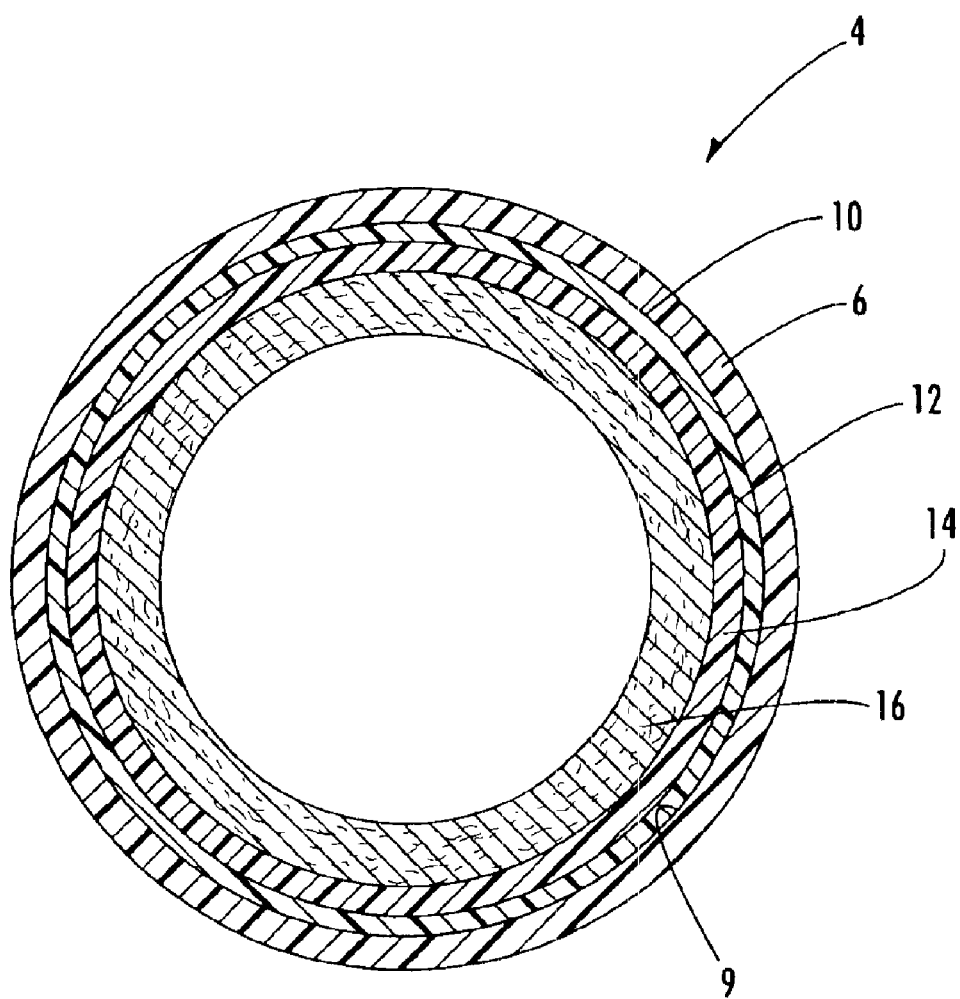
FIG. 4 is a cross-sectional view through the line 3—3 of FIG. 1 showing the lining hose fully installed after the calibration hose has been removed in accordance with the method of the present invention.

The calibration hose 18 can then be removed from the lining hose 12 using techniques known in the art. Typically, a rope or cable is attached to the trailing end of the calibration hose 18. An operator pulls on the rope or cable to remove the calibration hose 18 from the lining hose 12. FIG. 4 shows the pipeline 4 with inside walls 6 after the calibration hose 18 has been removed. The lining hose 12 is firmly fixed to the interior walls 6 of the pipeline. After removal of the calibration hose 18, the service lines to pipeline 6 is reopened using a conventional robotic cutting device (not shown).

The resulting pipeline is a repaired composite structure shown generally as 4 in FIG. 4, including the lining hose 12 adhered to the inner surface 9 of the pipeline 6. The resulting composite pipeline structure 4 is rigid and has good mechanical integrity thus providing a leak-free and completely sealed monolithic structure. The lined pipeline 4 has high mechanical integrity and strength because the voids formed by the presence of periodic joints in the pipeline which are inherent in pipe fitting. The method of the present invention enables the voids at the joints to be filled to, in turn, provide a smooth and continuous interior surface. Thus, the structural integrity is greatly improved when a lining is installed in accordance with the present invention.

The present invention provides improvements over conventional lining methods used to repair pipelines. The combination of thermosetting resins 10, 17 on the interior surfaces 9 of the pipeline 6 and lining hose 12 generates a strong adhesive bond once the resins 10, 17 are cured. As a result, the lining hose 12 is securely attached to the inside of the pipeline 6 and is less likely to be separated therefrom. This repaired pipeline 6, as shown in FIG. 4, has good structural integrity and tends not to delaminate.

It should be understood that the resins 10, 17 are preferably epoxies. The outer layer of the lining hose 12 can be made from a material such as polyvinyl chloride, polyurethane, polyethylene, polypropylene, and polyamides. The inner layer 16 of the lining hose 12 can be made from a non-woven fibrous material such as a polyester-needled felt. The calibration hose 18 can be introduced into the lining hose 12 by an inversion process, and the pressurized fluid that is injected into the calibration hose can be water. Preferably, the water has a temperature of at least 100° F. and more preferably a temperature of about 130° F.

Preferably, similar thermosetting curable resins are used to coat the interior pipeline walls and lining hose. For example, identical or similar epoxy resins may be used. If the thermosetting resins are compatible with each other, there may be a synergistic effect, and the interfacial adhesion between the opposing surfaces may be improved. As adhesion improves, the mechanical strength and durability of the resulting composite pipeline structure will improve.

It is appreciated by those skilled in the art that various changes and modifications can be made to the description and illustrated embodiments without departing from the spirit of the present invention. All such modifications and changes are intended to be covered by the appended claims.

What is claimed is:

1. A method for installing a liner in an underground pipeline, having an interior and exterior surface, comprising the steps of:

applying a first thermosetting resin to the interior surface of the pipeline;

placing a lining hose, having an outer layer and inner layer, wherein the inner layer includes a second thermosetting resin, in a collapsed state in the pipeline;

placing a calibration hose in the lining hose;

introducing pressurized heated water into the calibration hose;

pressing the calibration hose against the inner layer of the lining hose and in communication with the second resin;

pressing the lining hose against the interior surface of the pipeline with the first resin residing therebetween to cure the first and second thermosetting resins so that the lining hose bands to the interior surface of the pipeline; and removing the calibration hose from the lining hose.

2. The method of claim 1, wherein the first resin and second resin are made of epoxy.

3. The method of claim 2, wherein the first resin is a structural epoxy.

4. The method of claim 2, wherein the second resin is a slow cure, NSF epoxy.

5. The method of claim 1, wherein the outer layer of the lining hose is made of a material selected from the group consisting of polyvinyl chloride, polyurethane, polyethylene, polypropylene, polyesters, and polyamides.

6. The method of claim 1, wherein the inner layer of the lining hose further includes a non-woven fibrous material.

7. The method of claim 6, wherein the non-woven fibrous material is a polyester-needled felt.

8. The method of claim 1, wherein the step of pressing the calibration hose against the inner layer of the lining hose includes inverting the calibration hose.

9. The method of claim 1, wherein the pressurized fluid introduced into the calibration hose is water.

10. The method of claim 1, wherein the pressurized heated water has a temperature of at least 100° F.

11. The method of claim 1, wherein the pressurized heated water has a temperature of about 130° F.

12. The method of claim 1, further comprising the step of:

maintaining the pressurized heated water in the calibration hose for 4–36 hours.

13. The method of claim 1, wherein the calibration hose is manufactured of vinyl.

14. The method of claim 1, further comprising the step of: cleaning the interior surface with water.

15. The method of claim 1, further comprising the step of: cleaning the interior surface with air.

16. The method of claim 1, further comprising the step of: cleaning the interior surface with steam.

17. The method of claim 1, further comprising the step of: clearing the pipeline with air.

18. The method of claim 1, wherein the first resin is applied to a thickness of ⅛ of an inch.

* * * * *